(12) United States Patent
Tien et al.

(10) Patent No.: US 10,890,794 B2
(45) Date of Patent: Jan. 12, 2021

(54) DISPLAY DEVICE

(71) Applicant: HON HAI PRECISION INDUSTRY CO., LTD., New Taipei (TW)

(72) Inventors: Hao-Ting Tien, New Taipei (TW); I-Wei Chen, New Taipei (TW); Wei-Cheng Chen, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 16/574,490

(22) Filed: Sep. 18, 2019

(65) Prior Publication Data
US 2020/0174301 A1 Jun. 4, 2020

Related U.S. Application Data

(60) Provisional application No. 62/774,534, filed on Dec. 3, 2018.

(51) Int. Cl.
| | | |
|---|---|---|
| *G02F 1/1333* | (2006.01) | |
| *G02F 1/1335* | (2006.01) | |
| *G02F 1/1339* | (2006.01) | |
| *H04N 5/225* | (2006.01) | |
| *G02F 1/1368* | (2006.01) | |

(52) U.S. Cl.
CPC .... *G02F 1/133345* (2013.01); *G02F 1/13394* (2013.01); *G02F 1/133512* (2013.01); *G02F 1/133514* (2013.01); *G02F 1/133528* (2013.01); *H04N 5/2257* (2013.01); *G02F 1/1368* (2013.01); *G02F 2001/13396* (2013.01); *G02F 2001/13398* (2013.01)

(58) Field of Classification Search
None
See application file for complete search history.

(56) References Cited

U.S. PATENT DOCUMENTS

| | | | |
|---|---|---|---|
| 2014/0063407 A1* | 3/2014 | Kwon | G02F 1/13338 349/58 |
| 2014/0071391 A1* | 3/2014 | Yang | G02F 1/133345 349/138 |
| 2017/0187934 A1* | 6/2017 | Kwak | G02F 1/1333 |
| 2018/0107241 A1 | 4/2018 | Evans, V et al. | |
| 2019/0310501 A1* | 10/2019 | Nagata | G02F 1/133371 |
| 2019/0331960 A1* | 10/2019 | Li | G02F 1/13318 |
| 2020/0117034 A1* | 4/2020 | Yin | G02F 1/1339 |
| 2020/0236259 A1* | 7/2020 | Nakamura | H01L 51/5253 |

FOREIGN PATENT DOCUMENTS

| | | |
|---|---|---|
| CN | 108476276 A | 8/2018 |
| TW | 201727307 A | 8/2017 |

* cited by examiner

*Primary Examiner* — Shan Liu
(74) *Attorney, Agent, or Firm* — ScienBiziP, P.C.

(57) ABSTRACT

A device with a display uninterrupted by a camera includes a display panel and the camera. The display device defines a display area for displaying images and a light transmission area surrounded by the display area. The camera is in the light transmission area and can collect light for images through the light transmission area.

6 Claims, 8 Drawing Sheets

DISPLAY DEVICE

FIELD

The subject matter herein generally relates to display devices.

BACKGROUND

Display devices, such as mobile phones and tablets, generally include a display panel and a camera module. A display device with a large display area (high screen ratio) is usually preferred by consumers.

A display device having a high screen ratio refers to a display device having a narrow border with a notched area for a camera. However, such display devices must define a special area for the camera module, the display panel must define a through hole corresponding to the camera module, and the camera module extends through the display panel. A display device defining one through hole in the display area for the camera module limits the screen ratio.

Therefore, there is room for improvement in the art.

BRIEF DESCRIPTION OF THE DRAWINGS

Implementations of the present disclosure will now be described, by way of embodiment, with reference to the attached figures.

DETAILED DESCRIPTION

Figure 1:
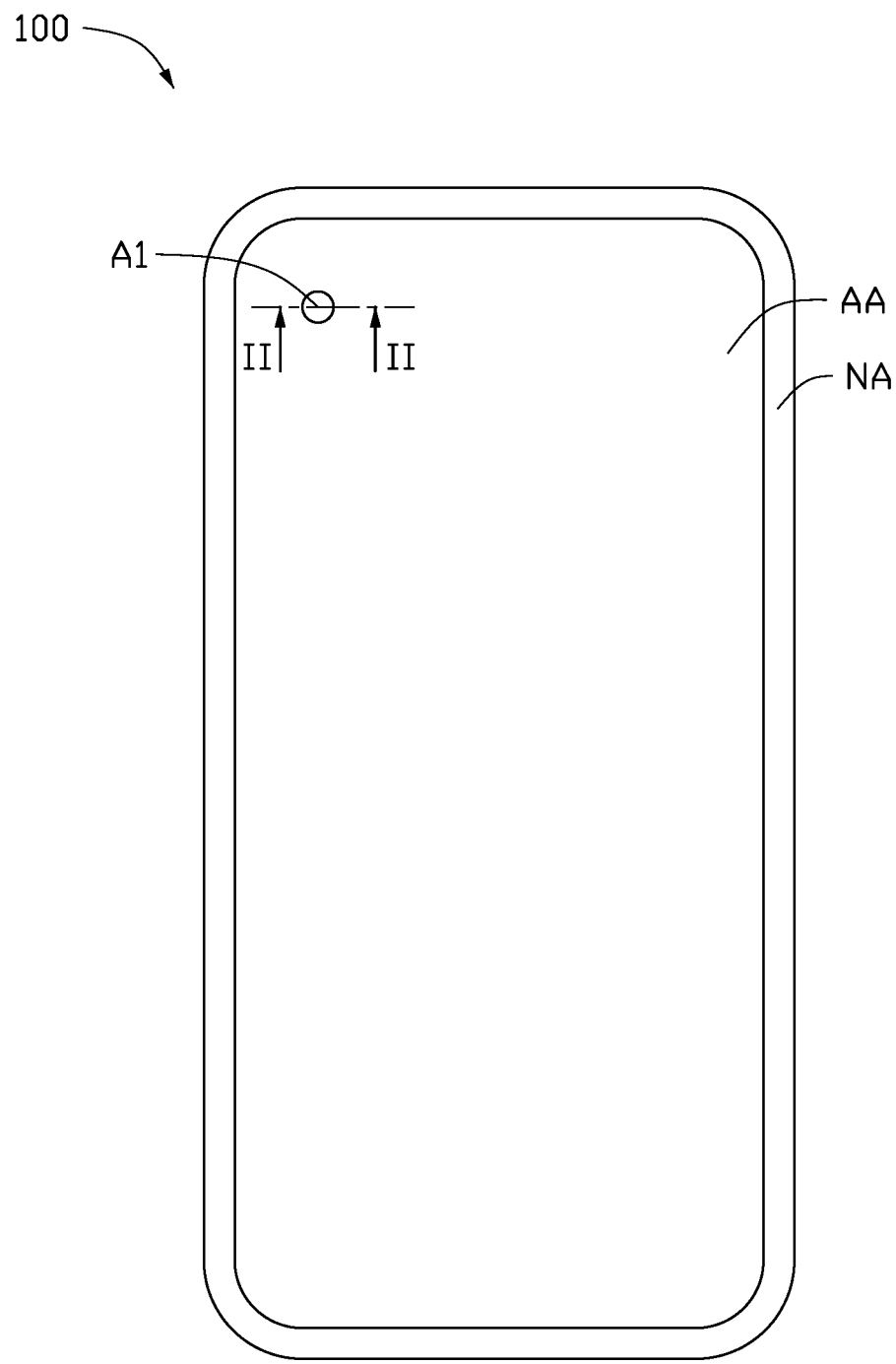
FIG. 1 is a schematic plan view of a display device according to a first embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". The term "circuit" is defined as an integrated circuit (IC) with a plurality of electrical elements, such as capacitors, resistors, amplifiers, and the like.

First Embodiment

Figure 2:
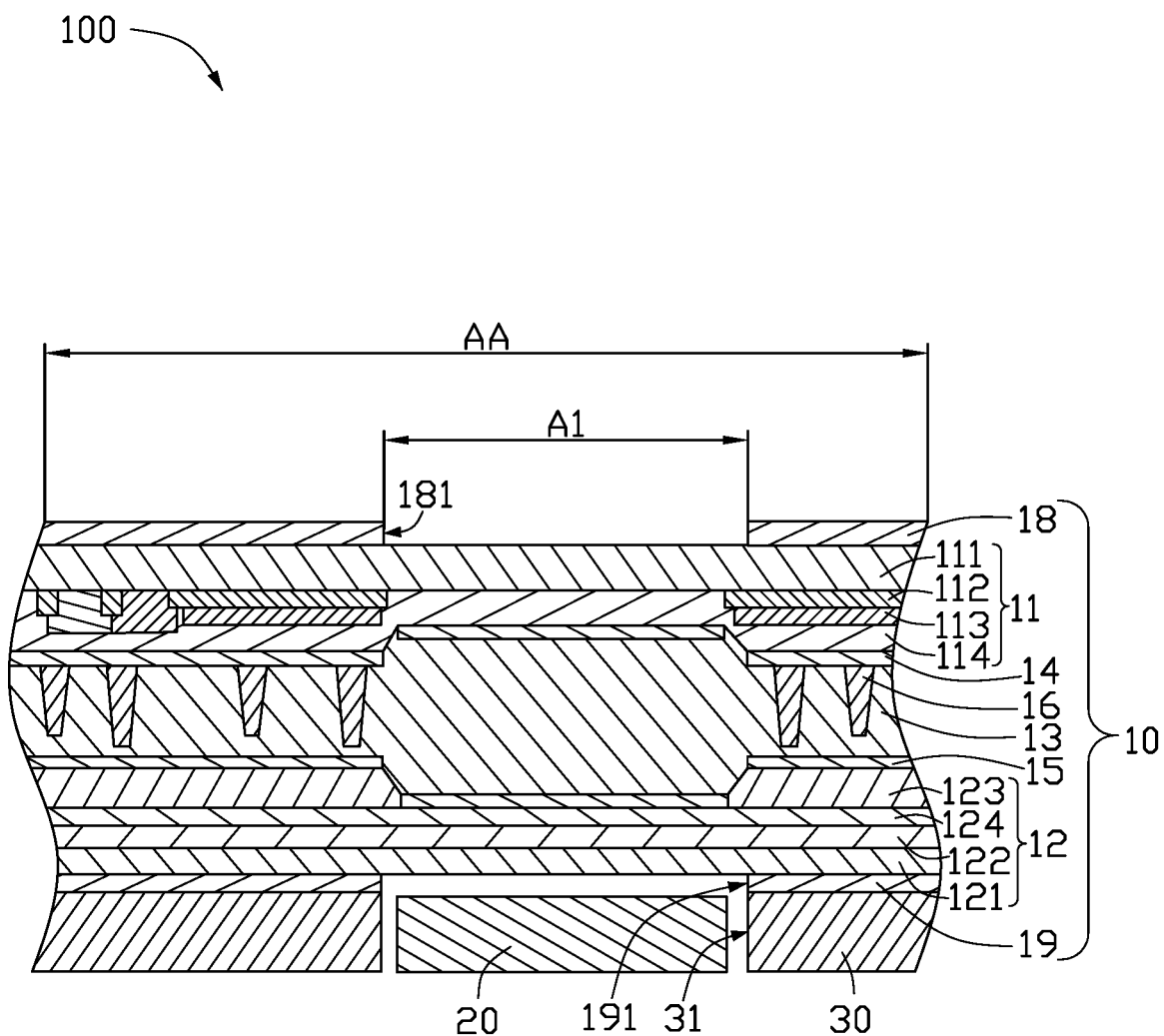
FIG. 2 is a cross-sectional view along line II-II of FIG. 1.

FIGS. 1 and 2 show a display device 100 according to a first embodiment. As shown in FIG. 1, the display device 100 defines a display area AA for displaying images, a continuous border area NA surrounding the display area AA, and a light transmission area A1 surrounded by the display area AA. The light transmission area A1 is separated from the border area NA by a portion of the display area AA. That is, the light transmission area A1 is not adjacent to the border area NA. In one embodiment, the display device 100 includes only the display area AA and the light transmission area A1 surrounded by the display area AA, and does not include the border area NA. Thus, a borderless design of the display device 100 can be realized.

As shown in FIG. 2, the display device 100 includes a display panel 10 and a camera 20. The camera 20 is arranged to correspond to the light transmission area A1 of the display device 100, for acquiring images. The display device 100 has a display surface for displaying images, and the camera 20 is on a side of the display panel 10 away from the display surface. The light transmission area A1 allows external light to enter the lens of the camera 20, and is not used for displaying images. A projection of the camera 20 on the display panel 10 falls within the range of a projection of the light transmission area A1 on the display panel 10, or the projection can be approximately equal to the projection of the light transmission area A1 on the display panel 10.

In the display device 100, the camera 20 is arranged on the side of the display panel 10 away from the display surface, and light for images is collected through the light transmission area A1 surrounded by the display area AA, without opening a through hole in the display panel 10 to set up a special area for placing the camera module, thus increasing the screen ratio of the display device 100. In one embodiment, the display device 100 is a liquid crystal display device. The display panel 10 includes an array substrate 12, a color filter substrate 11 opposite to the array substrate 12, and a liquid crystal layer 13 between the array substrate 12 and the color filter substrate 11. A first alignment layer 14 is between the color filter substrate 11 and the liquid crystal layer 13. A second alignment layer 15 is between the array substrate 12 and the liquid crystal layer 13. The liquid crystal layer 13, the first alignment layer 14, and the second alignment layer 15 correspond to the display area AA and the light transmission area A1. In order to maintain a cell thickness of the liquid crystal cell, the display area AA is provided with a plurality of first spacers 16 supported between the array substrate 12 and the color filter substrate 11. Each of the first spacers 16 is a cylinder having a diameter of approximately 10 to 20 microns.

The color filter substrate 11 includes a first substrate 111, a black matrix 112, a filter layer 113, and a transparent protective layer 114. Both the black matrix 112 and the filter layer 113 are on a surface of the first substrate 111 close to the liquid crystal layer 13, and both are in the display area AA. The transparent protective layer 114 corresponds to the display area AA and the light transmission area A1. That is, only the transparent protective layer 114 corresponding to the light transmission area A1 remains on the first substrate 111. In corresponding to the display area AA, the transparent protective layer 114 covers the black matrix 112 and the filter layer 113.

In manufacturing process, the black matrix 112 and the filter layer 113 can be formed on the first substrate 111 corresponding to the display area AA and the light transmission area A1 at the same time. The black matrix 112 and the filter layer 113 of the light transmission area A1 can then be removed through a mask, and the transparent protective layer 114 can be coated to correspond to the display area AA and the light transmission area A1. Since the black matrix 112 and the filter layer 113 in the light transmission area A1 have been removed, a portion of the transparent protective layer 114 in the light transmission area A1 is recessed toward the first substrate 111 with respect to a portion of the transparent protective layer 114 in the display area AA. That is, a height of the portion of the transparent protective layer 114 in the light transmission area A1 is significantly lower than a height of the portion of the transparent protective layer 114 in the display area AA.

The array substrate 12 includes a second substrate 121, a first insulation layer 122 on a side of the second substrate 121 facing the liquid crystal layer 13, and a second insulation layer 123 on a side of the first insulation layer 122 away from the second substrate 121. The first insulation layer 122 is arranged to correspond to the display area AA and the light transmission area A1, and the first insulation layer 122 is an organic material layer. The second insulation layer 123 is arranged to correspond to the display area AA, and the second insulation layer 123 is a layer of silicon nitride or a layer of silicon oxide. A thin film transistor layer 124 is between the first insulation layer 122 and the second insulation layer 123. The thin film transistor layer 124 includes, for example, a gate electrode layer, a gate insulation layer, an active layer, a source and drain electrode layer, and the like. In order to prevent the thin film transistor layer 124 from affecting intensity of light collected by the camera 20, the thin film transistor layer 124 is in the display area AA. That is, the light transmission area A1 is not provided with the thin film transistor layer 124, only the first insulation layer 122 corresponding to the light transmission area A1 remains on the second substrate 121. During the manufacturing process, the second insulation layer 123 of the light transmission area A1 can be removed by a mask.

Pixel electrodes (not shown) and common electrodes (not shown) are also provided in the display area AA. In one embodiment, the pixel electrodes and the common electrodes are in the display area AA, and generate an electric field to rotate the liquid crystal molecules in the liquid crystal layer 13 for displaying images.

As shown in FIG. 1, the display device 100 further includes a first polarizer 18 and a second polarizer 19. The first polarizer 18 is on a side of the color filter substrate 11 away from the array substrate 12. The second polarizer 19 is on a side of the array substrate 12 away from the color filter substrate 11. The axes of light transmission of the first polarizer 18 and the second polarizer 19 are perpendicular to each other. The first polarizer 18 defines a first light-passing hole 181 at a position corresponding to the light transmission area A1. The second polarizer 19 defines a second light-passing hole 191 at a position corresponding to the light transmission area A1.

In one embodiment, the display device 100 may further include a cover plate (not shown), which is on a side of the first polarizer 18 away from the color filter substrate 11. The cover plate and the first polarizer 18 are bonded by transparent optical adhesive. After bonding, the transparent optical adhesive is infilled into the first light-passing hole 181 to cover the display area AA and the light transmission area A1.

As shown in FIG. 1, the display device 100 further includes a backlight module 30. The display panel 10 is on a side of the backlight module 30 from which light exits. The backlight module 30 defines a mounting hole 31 corresponding to the light transmission area A1. The camera 20 is in the mounting hole 31. The camera 20 can be fixedly connected with the backlight module 30 in the mounting hole 31 by adhesive or other means. The backlight module 30 includes a backlight source (not shown). The backlight source may be a direct type backlight source or an edge type backlight source.

In one embodiment, only the transparent protective layer 114, the first alignment layer 14, the liquid crystal layer 13, the second alignment layer 15, and the first insulation layer 122 corresponding to the light transmission area A1 remain between the first substrate 111 and the second substrate 121, so that light transmission is high. In addition, the first polarizer 18 defines the first light-passing hole 181 and the second polarizer 19 defines the second light-passing hole 191 at positions corresponding to the light transmission area A1, so that the color shift phenomenon is low. In the display device 100, the lens of the camera 20 can collect environmental light through the light transmission area A1 for capturing images. As the camera 20 is arranged on the side of the display panel 10 away from the display surface, and light for images is collected through the light transmission area A1 as surrounded by the display area AA, there is no need to open a through hole in the display panel 10 to set up a special area for placing the camera module. The border of the display device 100 can therefore be narrow or even non-existent, thereby increasing the screen ratio of the display device 100.

Second Embodiment

Figure 3:
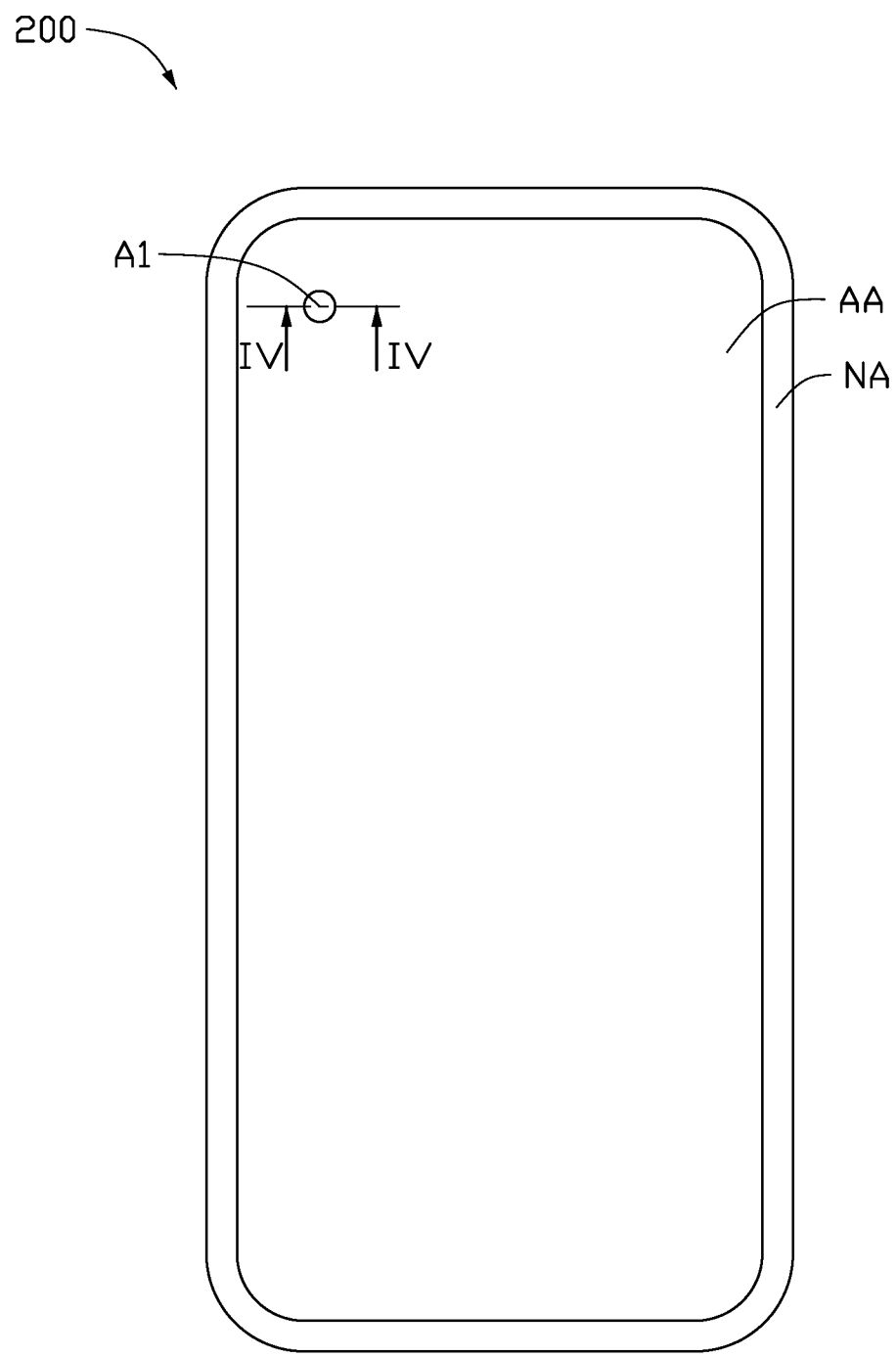
FIG. 3 is a schematic plan view of a display device according to a second embodiment.
Figure 4:
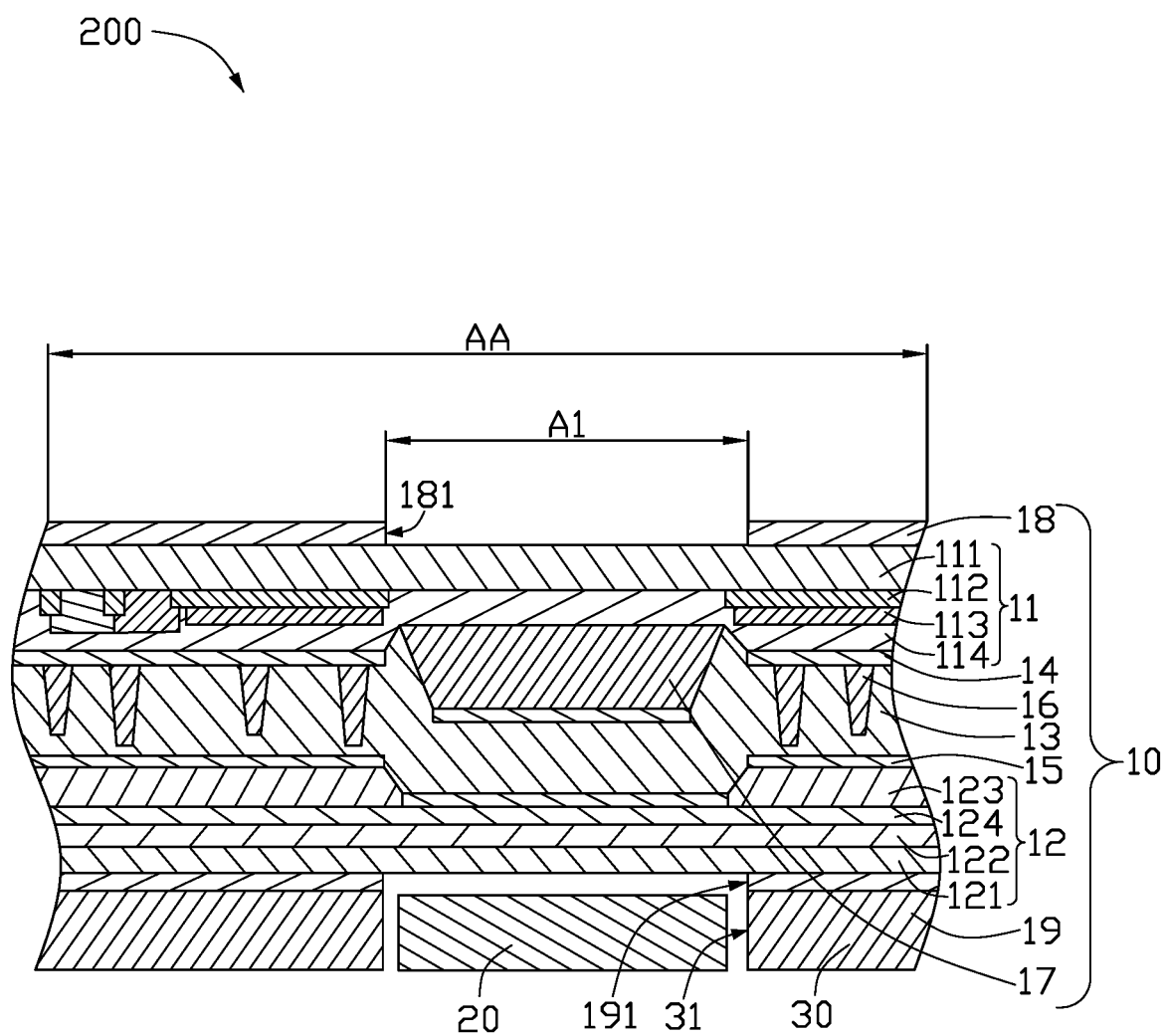
FIG. 4 is a cross-sectional view along line IV-IV of FIG. 3.

As shown in FIGS. 3 and 4, the display device 200 of the second embodiment differs from the display device 100 of the first embodiment in that, in the display device 200, the light transmission area A1 is provided with a second spacer 17 supported between the array substrate 12 and the color filter substrate 11, and the second spacer 17 is between the transparent protective layer 114 and the first alignment layer 14. Thus, in corresponding to the light transmission area A1, the transparent protective layer 114, the second spacer 17, the first alignment layer 14, the liquid crystal layer 13, the second alignment layer 15, and the first insulation layer 122 remain between the first substrate 111 and the second substrate 121. Compared with the display device 100, the second spacer 17 is added to correspond to the light transmission area A1, which increases a support strength of the display panel 10.

In one embodiment, the second spacer 17 is transparent. To prevent the second spacer 17 from affecting the imaging of the camera 20, there is only one second spacer 17. In addition, the second spacer 17 is a cylinder. One end of the second spacer 17 is fixed on the transparent protective layer 114, and the second spacer 17 tapers from its end close to the transparent protective layer 114 to its end away from the transparent protective layer 114. A cross-sectional size of the end of the second spacer 17 fixed to the transparent protective layer 114 is approximately the same size as the light transmission area A1. That is, a projection of the second spacer 17 on the color filter substrate 11 falls into the projection of the light transmission area A1 on the color filter substrate 11 or is approximately equal to the projection of the light transmission area A1 on the color filter substrate 11.

Third Embodiment

Figure 5:
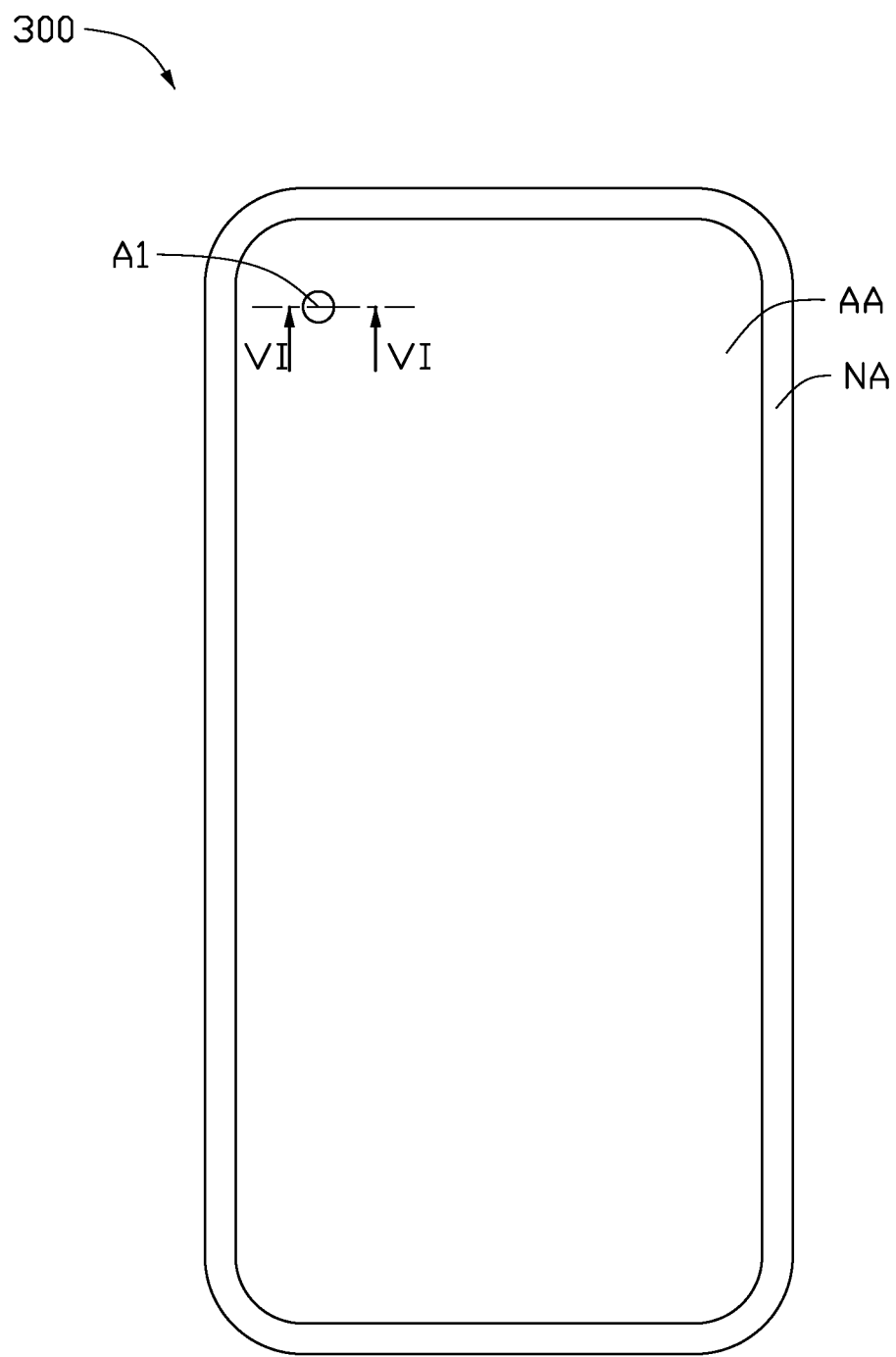
FIG. 5 is a schematic plan view of a display device according to a third embodiment.
Figure 6:
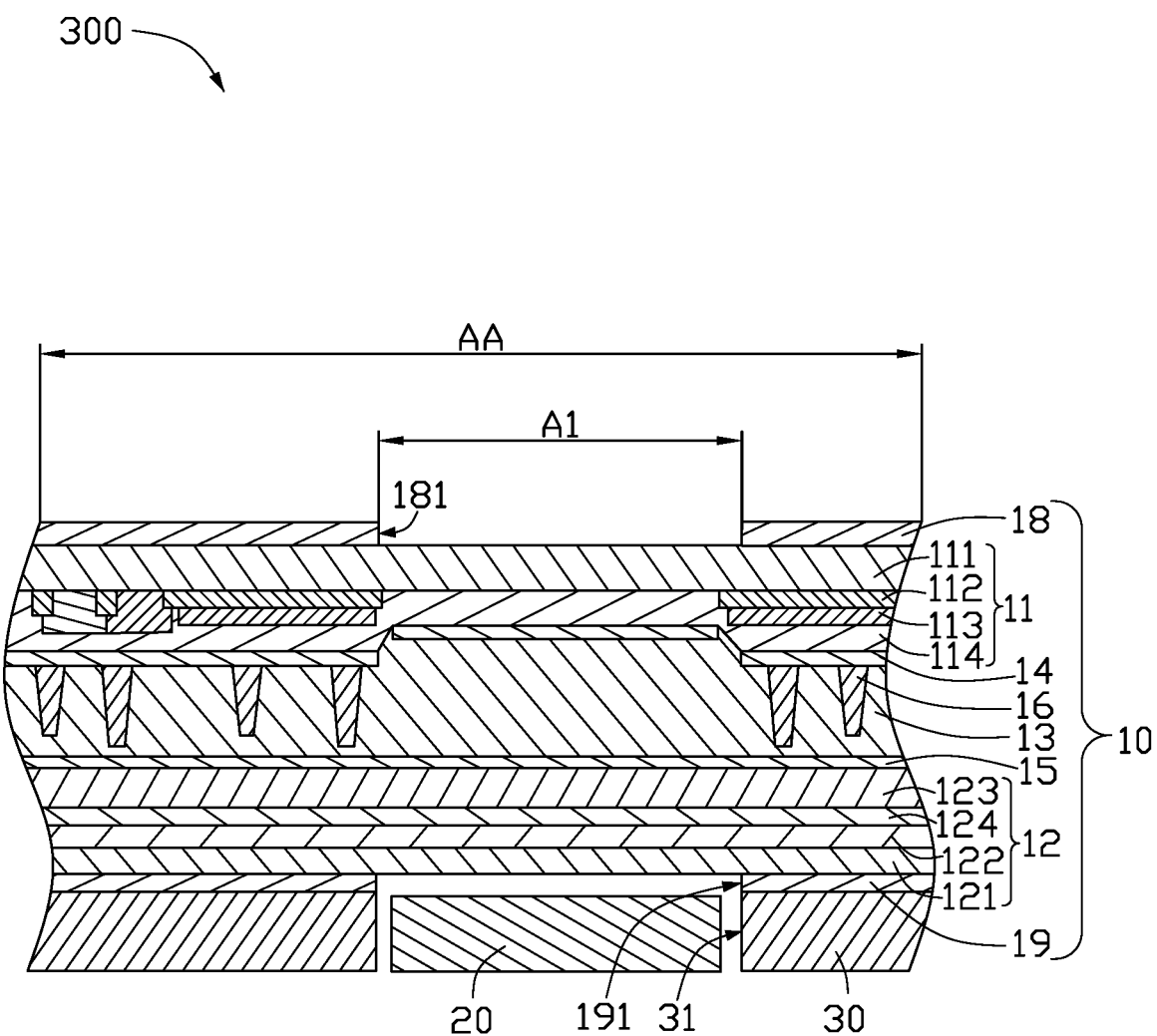
FIG. 6 is a cross-sectional view along line VI-VI of FIG. 5.

As shown in FIGS. 5 and 6, the display device 300 of the third embodiment differs from the display device 100 of the first embodiment in that, during the manufacturing process of the display device 300, the insulating layer 123 corresponding to the light transmission area A1 does not need to be removed by a mask. The second insulation layer 123 is arranged to correspond to the display area AA and to the light transmission area A1. Thus, the manufacturing process can be simplified and the support strength of the array substrate 12 increased.

Fourth Embodiment

Figure 7:
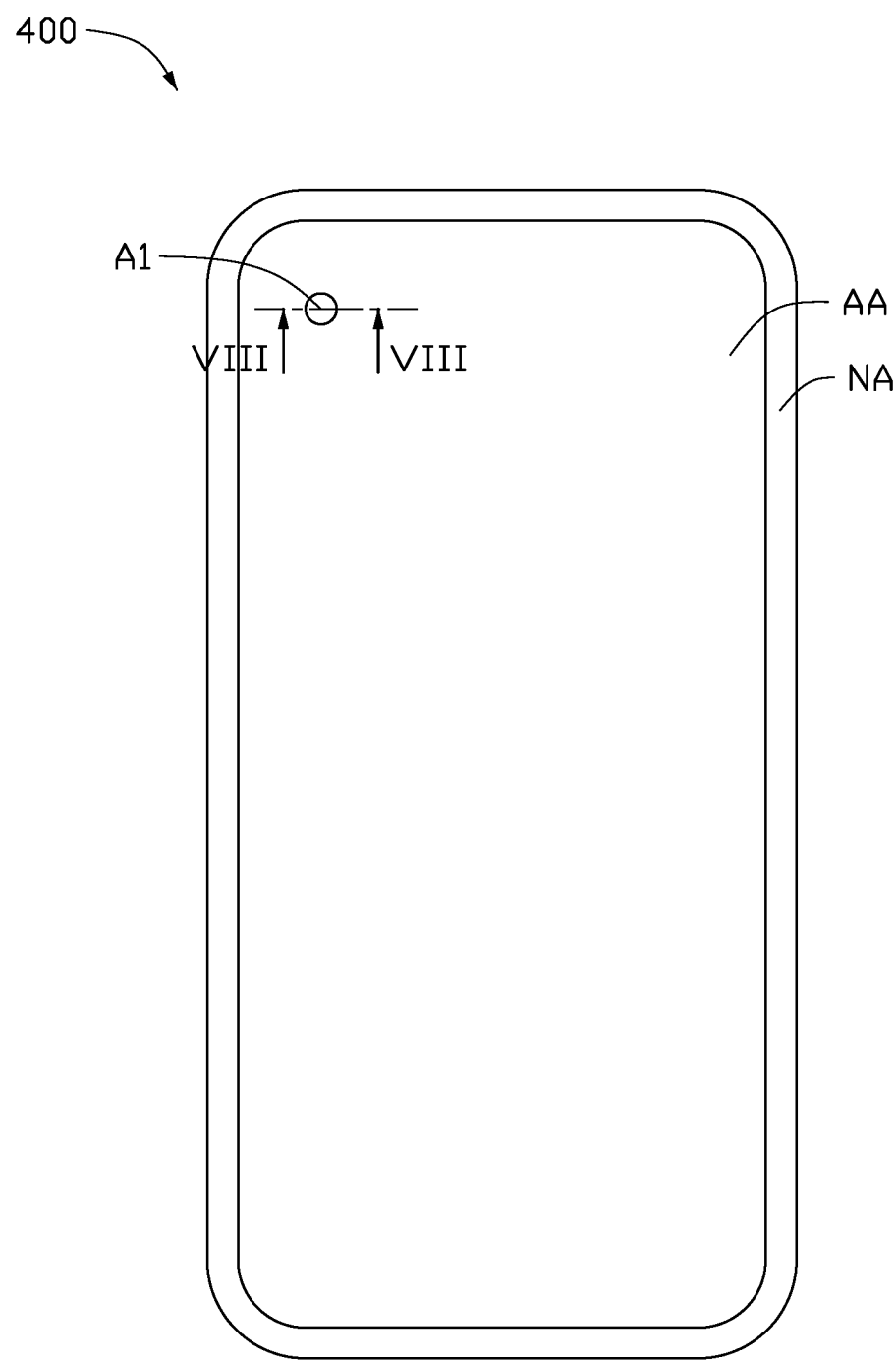
FIG. 7 is a schematic plan view of a display device according to a fourth embodiment.
Figure 8:
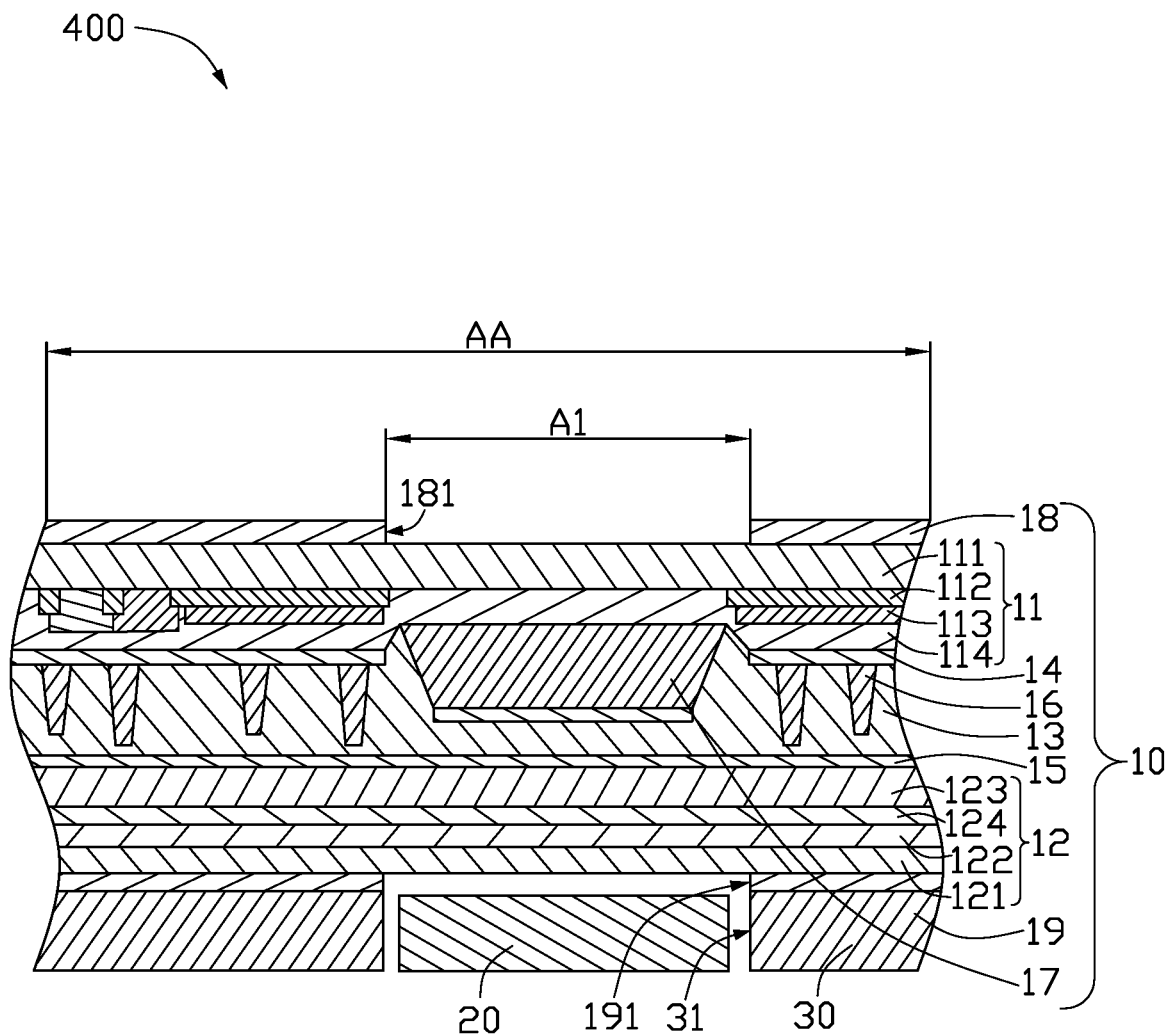
FIG. 8 is a cross-sectional view along line VIII-VIII of FIG. 7.

As shown in FIGS. 7 and 8, the display device 400 of the fourth embodiment differs from the display device 200 of the second embodiment in that, during the manufacturing process of the display device 400, the second insulation layer 123 of the light transmission area A1 does not need to be removed through a mask. The second insulation layer 123 is arranged to correspond to the display area AA and the light transmission area A1. Thus, the manufacturing process can be simplified and the support strength of the display panel 10 increased.

It is to be understood, even though information and advantages of the present exemplary embodiments have been set forth in the foregoing description, together with details of the structures and functions of the present exemplary embodiments, the disclosure is illustrative only. Changes may be made in detail, especially in matters of shape, size, and arrangement of parts within the principles of the present exemplary embodiments to the full extent indicated by the plain meaning of the terms in which the appended claims are expressed.

What is claimed is:

1. A display device, comprising:
    a backlight module;
    a display panel comprising a display surface; and
    a camera on a side of the display panel away from the display surface,
    wherein the display device defines a display area for displaying images and a light transmission area surrounded by the display area, and the camera is in the light transmission area to collect image information through the light transmission area;
    wherein the display panel is on a side of the backlight module from which light exits, the backlight module defines a mounting hole extending through the backlight module, the mounting hole is in the light transmission area, and the camera is in the mounting hole;
    the display panel comprises an array substrate, a color filter substrate opposite to the array substrate, and a liquid crystal layer between the array substrate and the color filter substrate;
    the array substrate comprises a thin film transistor layer, the thin film transistor layer is in the display area and is not in the light transmission area;
    the liquid crystal layer is in the display area and the light transmission area;
    the color filter substrate comprises a first substrate, a black matrix and a filter layer, the black matrix and the filter layer are on a surface of the first substrate close to the liquid crystal layer, the black matrix and the filter layer are in the display area, and are not in the light transmission area;
    the color filter substrate further comprises a transparent protective layer, a projection of the transparent protective layer on the array substrate covers the display area and the light transmission area;
    a portion of the transparent protective layer in the light transmission area is on the surface of the first substrate close to the liquid crystal layer, a portion of the transparent protective layer in the display area covers the black matrix and the filter layer and is in direct contact with the black matrix and the filter layer, and the transparent protective layer defines a recess toward the first substrate aligning with the light transmission area.

2. The display device according to claim 1, wherein the array substrate further comprises a first insulation layer and a second insulation layer, both the first and the second insulation layers being in the display area and the light transmission area, wherein the thin film transistor layer is between the first insulation layer and the second insulation layer.

3. The display device according to claim 1, wherein the display panel further comprises:
    a first alignment layer between the color filter substrate and the liquid crystal layer, the first alignment layer being in the display area and the light transmission area; and
    a photo spacer between the color filter substrate and the first alignment layer, and the photo spacer being in the light transmission area and being transparent.

4. The display device according to claim 3, wherein a number of the photo spacer is one, and a projection of the photo spacer on the color filter substrate is within a projection of the light transmission area on the color filter substrate or a projection of the photo spacer on the color filter substrate is equal to the projection of the light transmission area on the color filter substrate.

5. The display device according to claim 3, wherein the display panel further comprises a second alignment layer between the array substrate and the liquid crystal layer, and the second alignment layer is in the display area and the light transmission area.

6. The display device according to claim 1, further comprising a first polarizer on a side of the display panel away from the camera and a second polarizer between the display panel and the camera, wherein the first polarizer defines a first light through hole corresponding to the light transmission area, the second polarizer defines a second light-passing hole corresponding to the light transmission area, and axes of light transmission of the first polarizer and the second polarizer are perpendicular to each other.

* * * * *